United States Patent
Sreekumar et al.

(10) Patent No.: US 11,863,530 B1
(45) Date of Patent: Jan. 2, 2024

(54) SYSTEMS AND METHODS FOR VIRTUAL PRIVATE NETWORK AUTHENTICATION

(71) Applicant: AVIATRIX SYSTEMS, INC., Santa Clara, CA (US)

(72) Inventors: Arvind Sreekumar, Santa Clara, CA (US); Ramkrishnan Kunnath, Milpitas, CA (US); Xiaobo Sherry Wei, Palo Alto, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 217 days.

(21) Appl. No.: 17/307,885

(22) Filed: May 4, 2021

Related U.S. Application Data (60) Provisional application No. 63/022,222, filed on May 8, 2020.

(51) Int. Cl.
*H04L 29/00* (2006.01)
*H04L 9/40* (2022.01)

(52) U.S. Cl.
CPC ...... *H04L 63/0272* (2013.01); *H04L 63/0236* (2013.01); *H04L 63/0815* (2013.01); *H04L 63/20* (2013.01)

(58) Field of Classification Search
CPC .............. H04L 63/0272; H04L 63/0236; H04L 63/0815; H04L 63/20
See application file for complete search history.

(56) References Cited

U.S. PATENT DOCUMENTS

| | | | |
|---|---|---|---|
| 9,565,190 B1* | 2/2017 | Telvik | H04L 63/083 |
| 2005/0132060 A1* | 6/2005 | Mo | H04L 51/212 |
| | | | 709/227 |
| 2006/0123465 A1* | 6/2006 | Ziegler | H04L 63/0861 |
| | | | 726/2 |

(Continued)

OTHER PUBLICATIONS

Ldapwiki: "SAML Authorization Decision Statement," https://ldapwiki.com/wiki/SAML%20Authorization%20Decision%20Statement. last accessed Apr. 8, 2020.

(Continued)

*Primary Examiner* — Jeffrey C Pwu
*Assistant Examiner* — Helai Salehi
(74) *Attorney, Agent, or Firm* — Winstead PC

(57) ABSTRACT

A computerized method for establishing a secure channel between a virtual private network (VPN) client processing on a network device for a user and a network gateway is disclosed. The computerized method includes operations of the controller of transmitting an authentication request to an identity provider based on receipt of a resource request from the VPN client, receiving an authentication response from the identity provider, generating an authentication token based on the authentication response and transmitting the authentication token to the VPN client, wherein the controller further stores the authentication token. The method includes operations of the network gateway of receiving a secure connection request from the VPN client that includes the authentication token, validating the authentication token by querying the controller, in response to validation of the authentication token, establishing the secure connection with VPN client, and providing the VPN client with access to resources via the secure connection.

20 Claims, 7 Drawing Sheets

(56) References Cited

U.S. PATENT DOCUMENTS

2017/0171154 A1* 6/2017 Brown .................... H04L 43/10

OTHER PUBLICATIONS

OASIS Security Services TC, "Security Assertion Markup Language (SAML) V2.0 Technical Overview" docs.oasis-open.org/security/saml/Post2.0/sstc-saml-tech-overview-2.0.html, last accessed Feb. 28, 2020.
Prithviraj S., "Iptables Tutorial—Securing Ubuntu VPS with Linux Firewall" https://www.hostinger.com/tutorials/iptables-tutorial, last accessed Jun. 16, 2021.
Russell Jones, "How SAML 2.0 Authentication Works" https://gravitational.com/blog/how-saml-authentication-works/, last accessed May 6, 2020.

* cited by examiner

SYSTEMS AND METHODS FOR VIRTUAL PRIVATE NETWORK AUTHENTICATION

CROSS-REFERENCE TO RELATED APPLICATIONS

This application claims the benefit of priority on U.S. Provisional Patent Application No. 63/022,222, titled "Systems and Methods for Virtual Private Network Authentication" and filed May 8, 2020, the entire contents of which are incorporated by reference herein.

FIELD

Embodiments of the disclosure relate to the field of virtual private network authentication. More specifically, one embodiment of the disclosure is directed to a method for establishing a secure channel between a network device utilizing a virtual private network (VPN) client and a network

GENERAL BACKGROUND

As is known in the art, a VPN client is utilized to establish a secure connection between a network device of a user and a VPN server or other networking construct. VPN clients may be logic or software applications that are downloadable and installable on a network. Some VPN clients may be a specially configured hardware device.

A VPN client utilizes a public network such as the internet to create a secure connection to between two networks. The secure connection may be a data tunnel through with network traffic may be transmitted. There are several advantages a user receives from utilizing a VPN client to access certain resources within a remote network including secure access to the remote network from anywhere in the world where internet connectivity is accessible. One common use of VPN clients is by corporations and employees, enabling the employees to securely and remotely access the corporate network.

As should be understood, utilization of a VPN client requires the user to provide certain authorization information in order for the VPN client to access a network. In conventional VPN clients, a user is required to provide logon credentials such as a username and password. As remembering usernames and passwords is often troublesome due to the number of usernames and passwords one has to remember, other authentication techniques would be preferred.

Therefore, what is needed is a VPN client that provides user with an efficient and updated authentication procedure.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Embodiments of the disclosure are directed to an authentication procedure performed by a VPN client that includes specific logic to perform operations utilizing a single sign-on scheme, such as SAML. Specifically, as is known in the art, a VPN client may operate on a network device of a user to establish a secure connection (e.g., a VPN tunnel) between the network and a gateway, e.g., deployed in a cloud computing network. In some instances, the gateway is managed by a controller also deployed within the cloud computing network. In order to establish the secure connection, the VPN client must authenticate the user with the gateway. The disclosure provides an authentication procedure implemented by the VPN client and controller that utilizes a single sign-on scheme.

The authentication procedure may be initiated by the VPN client, operating on a network device, through performance of operations that cause an internet browser instance ("browser") to launch and open a new tab or window. A resource request (e.g., a request for a one-time authentication token) is transmitted through the browser over a public network to a controller. Upon receipt of the resource request and following a determination that an active, valid logon session has been not established for the user, the controller performs an authentication request generation procedure. The authentication request is transmitted to an identity provider, which attempts to validate the user either through an active, valid logon session being established with the identity provider or the user providing valid logon credentials.

Following validation of the user by the identity provider, the identity provider generates an assertion representing whether the user provided valid logon credentials and, in some embodiments, may include a user identifier and the user's profile associations as well (e.g., used by the gateway to limit the environments to which the user has access). The assertion is then provided to the controller from the identity provider in an authentication response transmitted via the browser over the public network.

The controller then parses the authentication response to determine whether the authentication performed by the identity provider was successful, and if so, extract at least one or more profile associations of the user included within the authentication response, when applicable. The user identifier may also be extracted.

In the event that the authentication procedure of the identity provider was successful, the controller generates a one-time token, which is stored by the controller in a database. The controller also transmits the token and the one or more profile associations of the user, when applicable, to the VPN client through the browser.

Upon receiving the token and, optionally, the one or more profile associations of the user, the VPN client initiates a procedure to establish a secure channel between the network device and the VPN gateway via a VPN generation request that includes the received token and the one or more profile associations of the user.

Upon receiving the VPN connection request, the gateway queries the controller to validate the token and to retrieve parameters corresponding to the one or more profile associations of the user (e.g., allowed IP CIDR ranges). In some embodiments, when the VPN connection request includes one or more profile associations, the included profile associations may override the profile associations stored by the controller as discussed below. However, in other embodiments, the profile associations stored by the controller may over the profile associations received in the VPN connection request.

The controller validates the token through a comparison of the received token/user identifier pairing with the token/identifier pairings stored in a database by the controller. Upon validating the received token, the controller responds to the query indicating successful validation. The gateway then establishes the secure channel to the network device through the VPN client. Additionally, the gateway configures the gateway's firewall with one or more rules that restrict the user's access based to IP addresses behind the gateway based on the allowed IP CIDR ranges corresponding to the one or more profile associations of the user. The user is then provided access to authorized resources behind gateway via the VPN client.

I. TERMINOLOGY

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

The term "construct" may be construed as a virtual or physical logic directed to a particular functionality such as a gateway, virtual private cloud network (VPC), sub-network, or the like. For instance, as an illustrative example, the construct may correspond to virtual logic in the form of software (e.g., a virtual machine), which may assign a device-specific address (e.g., a Media Access Control "MAC" address) and/or an IP address within an IP address range supported by to a particular IP subnet. Alternatively, in some embodiments, the construct may correspond to physical logic, such as an electronic device that is communicatively coupled to the network and assigned the MAC and/or IP address(es). Examples of electronic devices may include, but are not limited or restricted to a personal computer (e.g., desktop, laptop, tablet or netbook), a mobile phone, a standalone appliance, a sensor, a server, or an information routing device (e.g., a router, bridge router ("brouter"), etc.). It is contemplated that each construct may constitute at least logic residing as part of a public network, although certain constructs may be deployed as part of an "on-premises" (or local) network.

The term "gateway" may refer to a software instance deployed within a public cloud network or a virtual private cloud network deployed with the public cloud network and controls the flow of data traffic within and from the public cloud network (e.g., to one or more remote sites including computing devices that may process, store and/or continue the routing of data). Herein, each gateway may operate as a "transit gateway" or "spoke gateway," which are gateways having similar architectures but are identified differently based on their location/configurations within a cloud computing environment. For instance, a "spoke" gateway is configured to interact with targeted instances while a "hub" gateway is configured to further assist in the propagation of data traffic (e.g., one or more messages) directed to a spoke gateway or a computing device within an on-premises network.

The term "controller" may refer to a software instance deployed within a cloud computing environment (e.g., resources of a public cloud network) that manages operability of certain aspects of one or more cloud computing environments spanning across different public cloud networks (multi-cloud network). For instance, a controller may be configured to collect information pertaining to each VPC and/or each gateway instance and configures one or more routing tables associated with one or more VPCs and/or gateway instances spanning a multi-cloud network to establish communication links (e.g., logical connections) between different sources and destinations. These sources and/or destinations may include, but are not restricted or limited to on-premises computing devices, gateway instances or other types of cloud resources.

The term "message" generally refers to information in a prescribed format and transmitted in accordance with a suitable delivery protocol. Hence, each message may be in the form of one or more packets, frames, or any other series of bits having the prescribed format.

The term "network device" may be construed as any electronic computing system with the capability of processing data and connecting to a network. Such a network may be a public network such as the internet or a private network such as a wireless data telecommunication network, wide area network, a type of local area network (LAN), or a combination of networks. Examples of a network device may include, but are not limited or restricted to, an endpoint device (e.g., a laptop, a mobile phone, a tablet, a computer, etc.), a standalone appliance, a server, a router or other intermediary communication device, a firewall, etc.

The term "link" may be generally construed as a physical or logical communication path between two or more constructs. For instance, as a physical communication path, wired and/or wireless interconnects in the form of electrical wiring, optical fiber, cable, bus trace, or a wireless channel using infrared, radio frequency (RF), may be used. A logical communication path includes any communication scheme that enables information to be exchanged between multiple constructs Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described

II. GENERAL ARCHITECTURE

Figure 1:
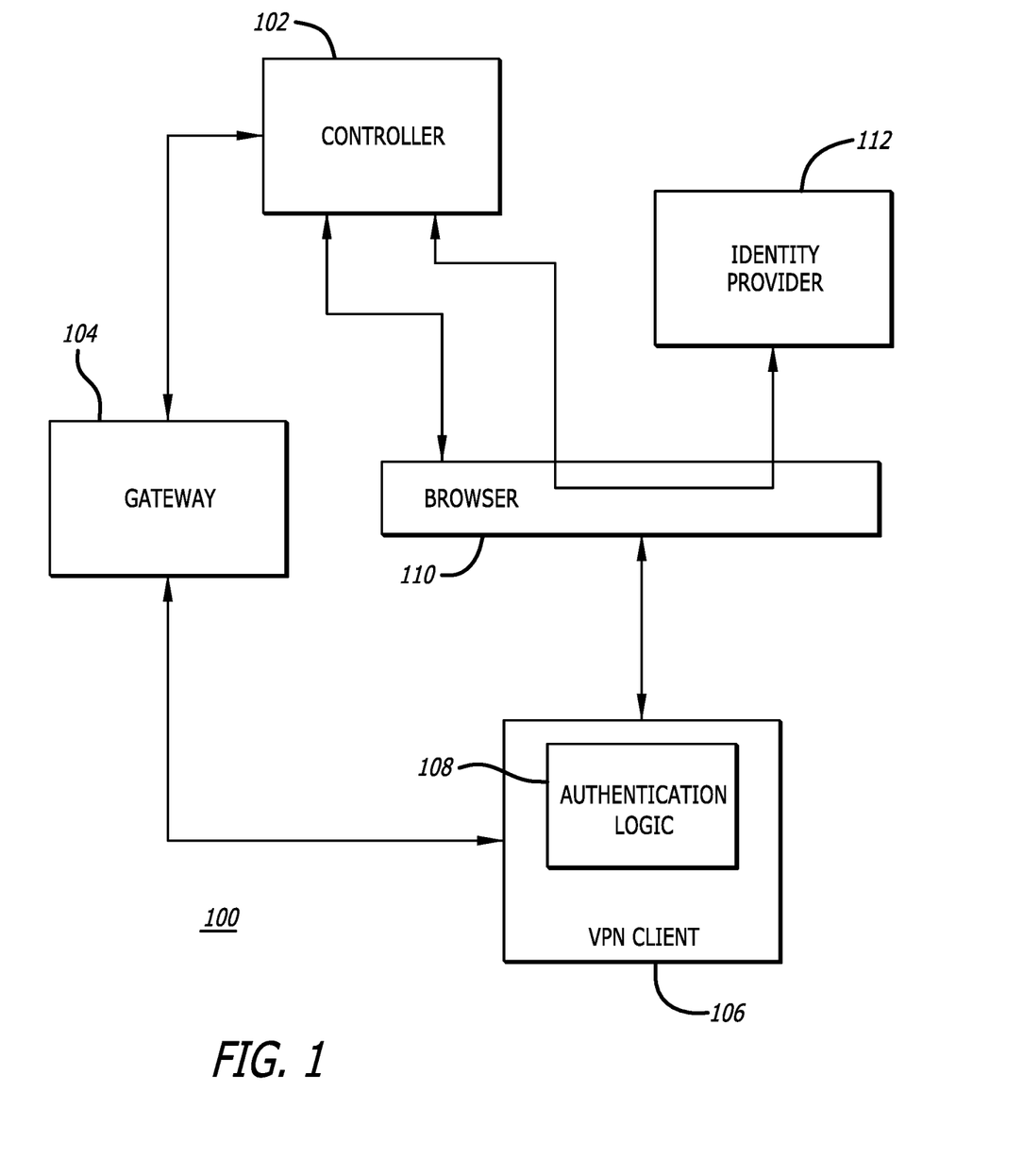
FIG. 1 is a diagram of an exemplary embodiment of a VPN client including logic configured to perform an authentication procedure implementing a single sign-on scheme according to some embodiments.

Referring now to FIG. 1, a diagram of an exemplary embodiment of a VPN client including logic configured to perform an authentication procedure implementing a single sign-on scheme is shown according to some embodiments. The network environment 100 is shown to include a controller 102 and a gateway 104 managed by the controller 102. In some embodiments, the controller 102 and the gateway 104 are software instances deployed in a cloud computing environment. The network environment 100 also includes a VPN client 106 including an authentication logic 108 that is configured to communicate with a browser 110. In some embodiments, the VPN client 106 and the browser 110 are configured for processing on a network device of a user (e.g., a laptop, mobile device, or other computing device configured for network connectivity).

In some embodiments, the VPN client 106 may be configured to communicate with the gateway 104 to perform and manage operations including authentication with the gateway 104 to set up the secure communication (e.g., the VPN tunnel), and modification of client environment parameters (e.g., route tables, DNS, network adapters, etc.).

Further, the network environment 100 includes an identity provider 112 that assists in facilitating an authentication procedure. Examples of the identity provider 112 include but are not limited or restricted to, OKTA®, ONELOGIN®, FACEBOOK®, GOOGLE®, etc.

Figure 2:
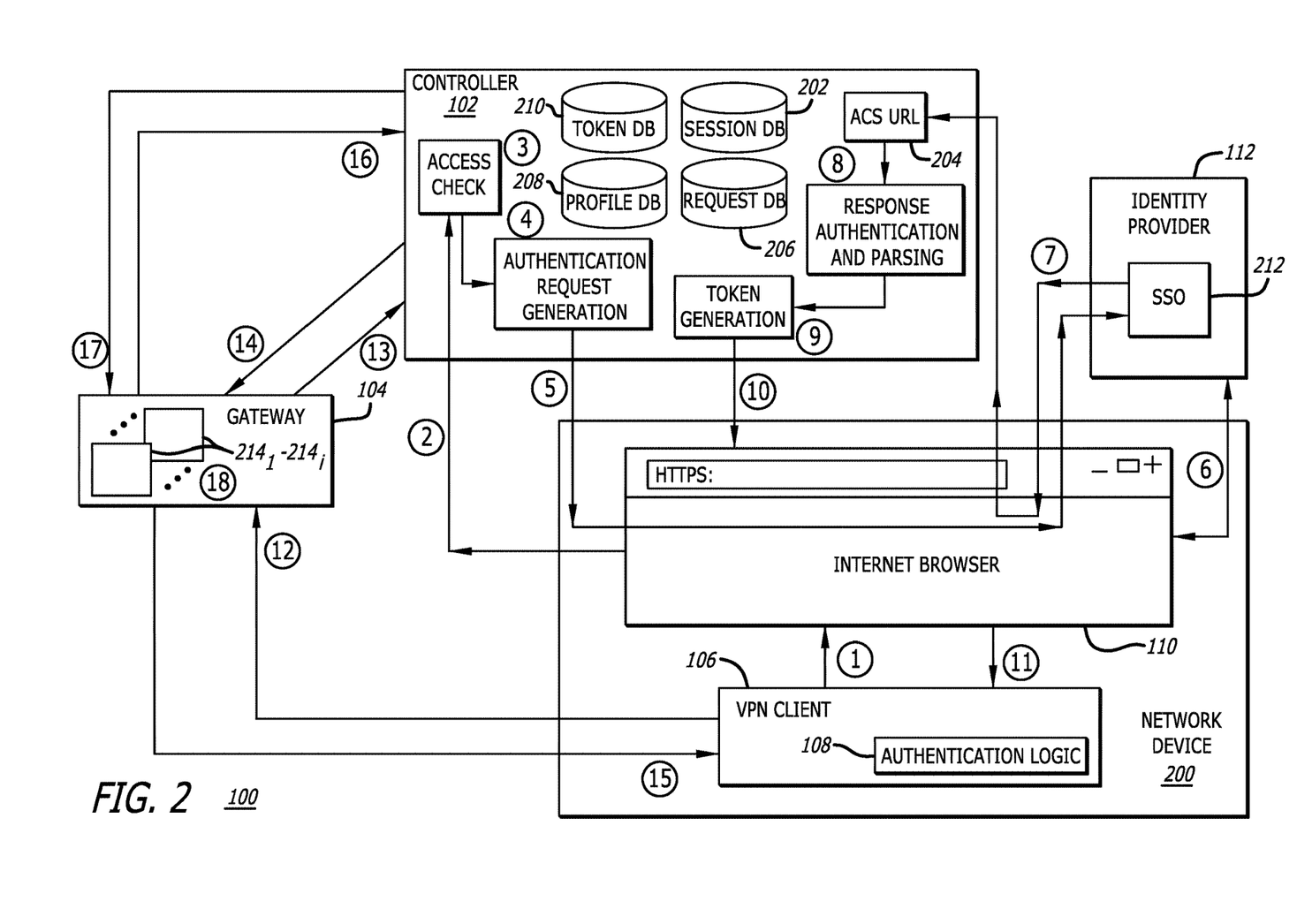
FIG. 2 is an illustration of a plurality of operations performed during an authentication procedure performed by the VPN client of FIG. 1 in accordance with some embodiments.

Referring to FIG. 2, an illustration of a plurality of operations performed during an authentication procedure performed by the VPN client of FIG. 1 is shown according to some embodiments. FIG. 2 includes a plurality of numerals, i.e., 1-18, with each numeral representing one or more operations performed by one or more components of the networking environment 100 or transmission of the data within the networking environment 100. As discussed throughout the disclosure, in some embodiments, an authentication procedure may include establishment of a secure channel between a network device utilizing a virtual private network (VPN) client and a network gateway using a single sign-on scheme, such as SAML. Although the operations discussed with respect to at least FIG. 2 illustrate the use of the SAML standard for exchanging authentication and authorization data, the disclosure is not limited or restricted to the use of the SAML procedure as the only single sign-on scheme.

Prior to initiation of the first operation illustrated in FIG. 2, it is assumed that the VPN client 106 has been downloaded and installed on the network device 200. The authentication procedure illustrated in FIG. 2 may be initiated by the receipt of user input received by the network device 200 indicating a desire by the user to utilize resources accessible through the gateway 104 that is managed by the controller 102 via the VPN client 106. As part of the initiation of the authentication procedure, the VPN client 106 is launched on the network device 200. As is shown, the VPN client 106 includes authentication logic 108 that implements a single sign-on scheme, e.g., SAML.

As a first operation in the authentication procedure, the authentication logic 108, upon execution by one or more processors of the network device 200, performs operations including causing the internet browser instance ("browser") 110 to launch and open a new tab or window, or open a new tab or window in the browser 110 in the event that the browser 110 has previously been launched (numeral 1). The authentication logic 108 then transmits a resource request to the controller 102 through the browser 110 over a public network such as the internet (numeral 2). The resource request includes at least a user identifier. In this example, the requested resource is a one-time authentication token for the user.

Upon receipt of the resource request, the controller 102 performs an access check procedure that includes determining whether the user currently has an active, valid logon session established (numeral 3). In one embodiment, the controller 102 may query the session database 202 to determine whether a valid session identifier corresponding to the user identifier included in the resource request is currently stored therein. In the event that an active, valid logon session has been not established for the user, the controller 102 performs an authentication request generation procedure (numeral 4).

In some embodiments, the authentication request is an Extensible Markup Language (XML) document that is URL-encoded. The authentication request is then added as a query parameter to the URL corresponding to the logon webpage of the identity provider 112 (collectively, numeral 4). As is known, a SAML authentication request includes several fields including an ID field. In some embodiments, the controller 102 may store a table pairing an authentication token (discussed below) and the time an authentication response was received by the controller from the identity provider in the request database 210. The time field enables the controller 102 to expire authentication requests after a predetermined time period (i.e., requiring the user to initiate another resource request).

Still referring to FIG. 2, upon adding the authentication request as a query parameter, the URL corresponding to the logon webpage of the identity provider 112 is then transmitted to the identity provider 112 using HTTP Redirect Binding. The redirect response is then passed by the browser 110 to the URL corresponding to the logon webpage of the identity provider 112, e.g., a Single Sign-On (SSO) service 212 (collectively, numeral 5).

The SSO 212 determines whether the user has an active, valid logon session established with the identity provider 112. Upon determining the user does not have an active, valid logon session established with the identity provider 112 prompts or "challenges" the user for credential information (numeral 6). In particular, the controller 102 does not store authenticating credentials for the user and, thus, requests such information from an identity provider, e.g., the identity provider 112. The identity provider 112 validates the user either through an active, valid logon session being established with the identity provider 112 or the user providing valid logon credentials.

Following validation of the user by the identity provider 112, the identity provider 112 generates a SAML assertion representing whether the user provided valid logon credentials. The SAML assertion may include, at least: (i) a status tag including a result of the user's authentication with the identity provider (success or failure); (ii) a subject tag identifying the user (e.g., an email address of the user, user's first and last name, employee identifier, etc.); (iii) an attribute statement tag, which may provide any other identifying information such as one or more profile associations of the user (e.g., admin, developer, guest, etc.), which may indicate a permission level once the user is provided access to various resources following authentication. Specifically, a user's profile associations may be used to limit the environments to which the user has access. The term "environment" may refer to any services within or outside a VPC (spoke or transit) that the gateway may directly reach (e.g., communicate with). As one example, an environment may include a range of IP CIDR addresses to which access in a cloud computing network is permitted using only specific protocols (HTTP, SSH, TCP, UDP, ICMP, etc., on only specified ports).

In some embodiments, one or more profile associations for the user may be stored on the controller 102. In such instances, the user's profile associations received from the identity will override the previously stored profile associations.

The SAML assertion is then digitally signed and placed within a SAML Response message. The SSO 212 performs a redirect to the Assertion Consumer Service (ACS) URL 204 of the controller 102 via a SAML binding an HTTP POST binding (numeral 7). Examples of SAML bindings include, but are not limited or restricted to HTTP POST, Simple Object Access Protocol (SOAP), "reverse SOAP" (PAOS), HTTP_REDIRECT, HTTP_ARTIFACT, etc. As is known to those in the art, an ACS URL is an endpoint where the identity provider will transmit an authentication response. In some embodiments, the ACS URL is an HTTPS endpoint used to transfer Personally Identifiable Information (PII).

The controller 102 then parses the SAML response message and verifies the digital signature of the identity provider 112 (numeral 8). For example, the controller 102 may verify the digital signature with a certificate, e.g., a public key, previously provided by the identity provider 112 and stored by the controller 102, e.g., in the request database 210. Further, parsing of the SAML response message extracts the status tag, the subject tag and the attributes statement tag, as discussed above. Assuming that the status tag indicates the authentication was successful, the controller 102 generates a one-time authentication token (numeral 9). The controller 102 then stores the token in a database (e.g., the token database 210). As discussed above, the one-time token may be any uniquely generated random string that is utilized for an authentication procedure.

Following generation of the token, the controller 102 transmits the token and one or more attributes included in the SAML response message to the VPN client 106 through the browser 110 (numerals 10-11). For example, in the illustrated embodiment, the token and the attributes may be transmitted to the VPN client 106 using an HTTP POST message from the browser 110 (numeral 10), which is posted to or retrieved by the local VPN client 106, e.g., by the authentication logic 108, processing on the network device 200 (numeral 11). In an alternative embodiment, the token and the attributes may be transmitted to the VPN client 106 by a request to open an application Uniform Resource Indicator (URI), which would cause a download (or other transfer) of the token, identifier and any other attributes to the VPN client 106. An application URI may be a custom protocol configured and registered to work with a specified application. As one example of an application URI, directing within a web browser for "company://test" would open an application defined for "company://" in the Operating System(OS) with the request.

Upon receiving the token and the one or more attributes from the controller 102, the VPN client 106 initiates a procedure to establish a secure channel between the network device 200 and the VPN gateway 104 using the token obtained via the SAML response message (numeral 12). In one embodiment, the VPN client 106 generates a VPN connection request that includes the token and one or more of the attributes received in the SAML response message (e.g., profile association information). Following generation, the VPN connection request is transmitted to the gateway 104.

Upon receiving the VPN connection request, the gateway 104 queries the controller 102 to validate the token and to retrieve parameters corresponding to the one or more profile associations of the user (numeral 13). The controller 102 validates the received token by comparing the received token to the token generated previously (at numeral 9) and stored by the controller 102. Upon validating the received token, the controller 102 responds to the query indicating successful validation (numeral 14).

In some embodiments, the controller 102 invalidates the token after the authentication is completed, so that a subsequent request would require a new one-time token. Alternatively, or in addition, the controller 102 may also invalidate the token is also when a SAML response message is not received within a predetermined time period, e.g., 2 minutes, 5 minutes, etc.

Upon receiving an indication that the token provided by the VPN client 106 is valid, the gateway 104 establishes the secure channel to the network device 200 through the VPN client 106 (numeral 15).

Following the establishment of the secure channel, the gateway 104 queries the controller 102 for firewall rules (e.g., corresponding to the user's profile associations) (numeral 16). In one example, the gateway 104 executes a script such as the learn_address script used with OPENVPN®. Specifically. the learn_address script is an OPENVPN® functionality that may be triggered upon a successful connection by from the gateway 104 and the VPN client 106. Execution of the learn-address script is triggered by the successful connection from the gateway 104, and causes transmission of a request to the controller 102 with the request including a username (or other identifier), virtual IP address, and an action (add/delete/update). The controller 102 generates the rules based on the information provided from the learn-address script, the predefined user profiles (e.g., allowed or denied IP CIDR ranges) and/or whitelisted/blacked IP ranges or domains.

The controller 102 determines allowed/denied IP CIDR ranges associated with the user's profile information (numeral 16). The controller queries a database, e.g., the profile database 208, to (i) retrieve profile associations of the user via the identifier of the user, and (ii) retrieves allowed/denied IP CIDR ranges associated with each profile association of the user, and/or whitelisted/blacked IP ranges or domains. For example, the profile database 208 may store a listing of all user/profile association pairings. Additionally, the profile database 208 may store pairings of predefined profile associations (e.g., admin, developer, guest, etc.) with allowed/denied IP CIDR ranges. In response to receiving the request generated on execution of the learn_address script, the controller 102 generates one or more rules to be implemented by the firewall of the gateway 104. The controller 102 responds to the request with the various allow/deny rules defined for various IP CIDR blocks corresponding to the one or more profile associations of the user (numeral 17).

The gateway 104 implements and stores the one or more rules $218_1$-$218_i$ provided by the controller 102 to restrict the user's access over the secure channel to IP addresses behind the gateway 104 (numeral 18). As a result, the user's access to certain resources is based on the profile information.

As one example, when the gateway 104 receives the one or more rules $218_1$-$218_i$, which may be IP packet filter rules, and configures a firewall of the gateway 104 with the rules $218_1$-$218_i$. As discussed above, the gateway 104 may configure the IP packet filter rules of a Linux kernel firewall implemented by or in association with the gateway 104. In one particular embodiment, the configuration of the IP packet filter rules is performed through the use of the "iptables" user-space module.

Following the establishment of the secure channel between the network device 200 and the gateway 104, and the generation of the rules restricting the user's access according to the user's profile information, the user is provided access to authorized resources behind gateway 104 via the VPN client 106.

III. Logical Representation

Figure 3:
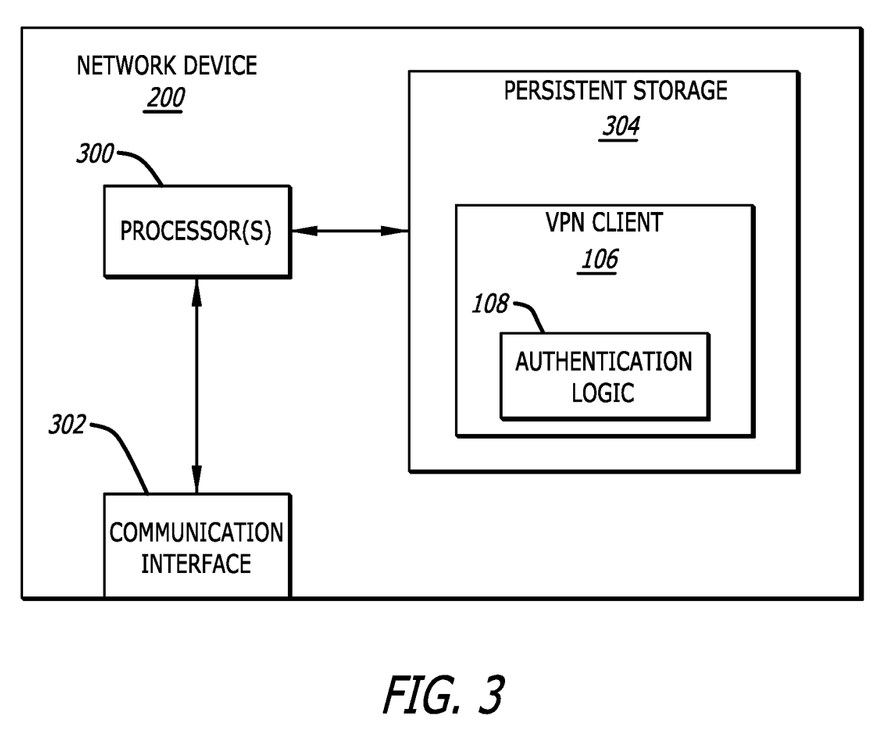
FIG. 3 is an exemplary illustration of a logical representation of the VPN client 103 of FIG. 1 installed and configured for execution on the network device 200 in accordance with some embodiments.

Referring now to FIG. 3, an exemplary illustration of a logical representation of the VPN client 103 of FIG. 1 installed and configured for execution on the network device 200 is shown in accordance with some embodiments. As shown, the network device 200 includes one or more processors ("processors") 300, a communication interface 302 and a persistent storage 304. In particular, the network device 200 may include a housing, which may be made entirely or partially of a hardened material (e.g., hardened plastic, metal, glass, composite or any combination thereof) that protects the circuitry within the housing.

The communication interface 302, in combination with a communication logic (not shown), enables communications with external network devices and/or other network appliances. The communication interface 302 may be implemented as a physical interface including one or more ports for wired connectors or one or more radio units for supporting wireless communications with other electronic devices. The persistent storage 304 may be non-transitory computer-readable storage medium and include the logic as software modules stored thereon, such as the VPN client 106. The operations of the VPN client 106, upon execution by the processors 302, are described herein at least with respect to FIGS. 2 and FIGS. 5A-6B.

Figure 4:
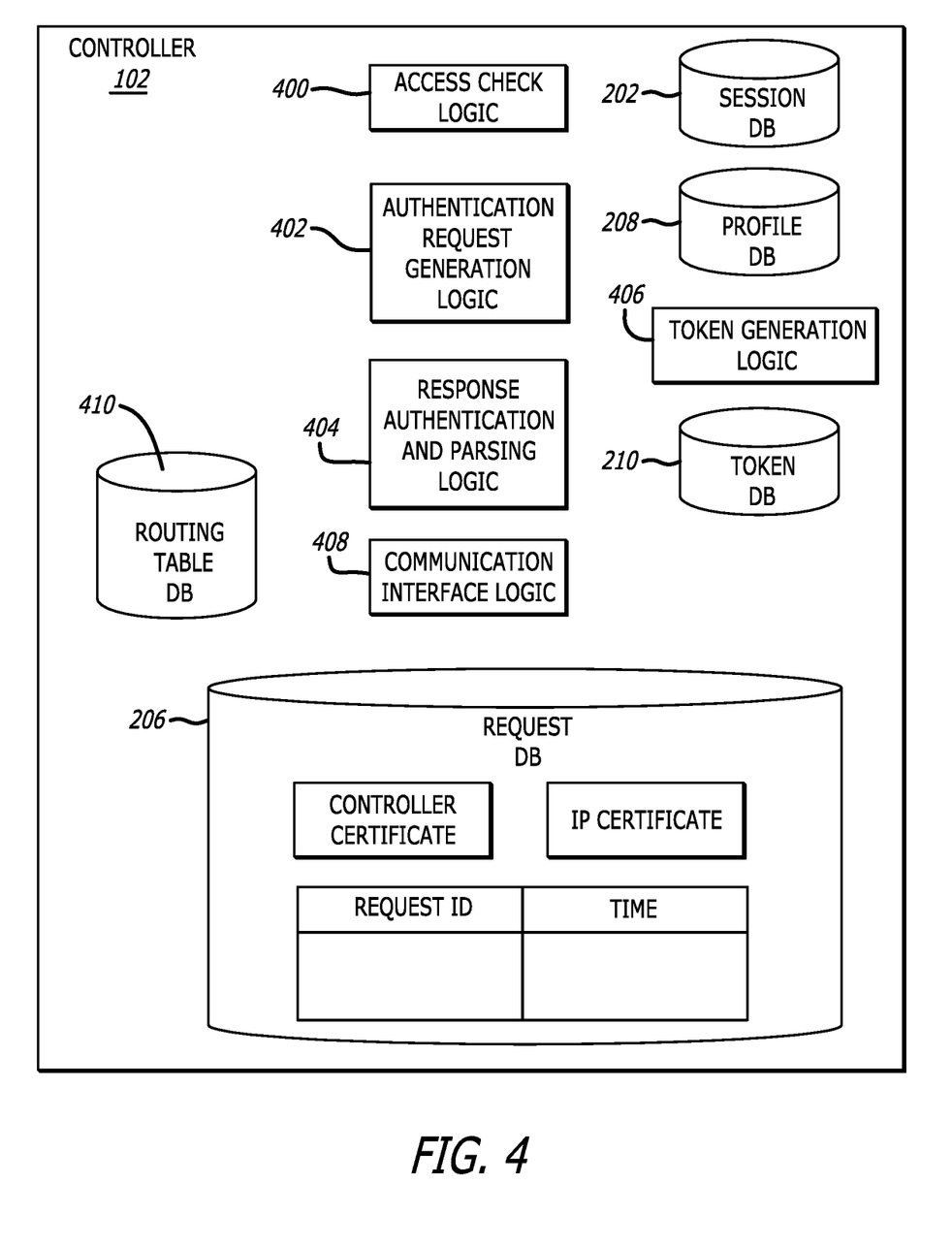
FIG. 4 is an exemplary illustration of a logical representation of the controller 102 of FIG. 1 in accordance with some embodiments.

Referring now to FIG. 4, an exemplary illustration of a logical representation of the controller 102 of FIG. 1 is shown in accordance with some embodiments. The controller 102, as noted above, may be a software instance deployed within a cloud network to assist in managing operability of constructs within one or more public cloud networks. According to this embodiment, the controller 102 may be configured with certain logic modules including at least an access check logic 400, an authentication request generation logic 402, a response receiving logic 404, a token generation logic 406, and a communication interface logic 408. The controller 102 may also include the profile database 208, the token database 210 and a routing table database 410.

The access check logic 400 may be configured to perform operations including those described with respect to numeral 3 of FIG. 2. The authentication request generation logic 402 may be configured to perform operations including those described with respect to numeral 4 of FIG. 2. The response authentication and parsing logic 404 may be configured to perform operations including those described with respect to numeral 8 of FIG. 2. The token generation logic 406 may be configured to perform operations including those described with respect to numeral 9 of FIG. 2.

The communication interface logic 408 may be configured to communicate with the constructs deployed within a computing network and managed, or accessible, by the controller 102. Additionally, the communication interface logic 408 may facilitate transmission of network data from the controller 102 to the browser 110 en route to the identity provider 112, for example.

The routing table database 206 may store VPC routing table data. For example, the controller 102 may configure a VPC routing table associated with each VPC to establish communication links (e.g., logical connections) between a transit gateway and cloud instances associated with a particular instance subnet. A VPC routing table is programmed to support communication links between different sources and destinations, such as an on-premise computing devices, a cloud instance within a particular instance subnet or the like. Thus, the controller 102 obtains and stores information that reveals certain properties of resources (e.g., constructs such as gateways, subnets, VPCs, instances within VPCs, etc.) within the purview of the controller 102 as well as status information pertaining to the connections (communication links) between with these resources.

Along with a pairing of predetermined profiles and corresponding allowed IP CIDR ranges, the profile database 208 may also store whitelisted or blacklisted IP CIDR ranges and/or whitelisted or blacklisted domain sets.

IV. Operational Flow

Figure 5:
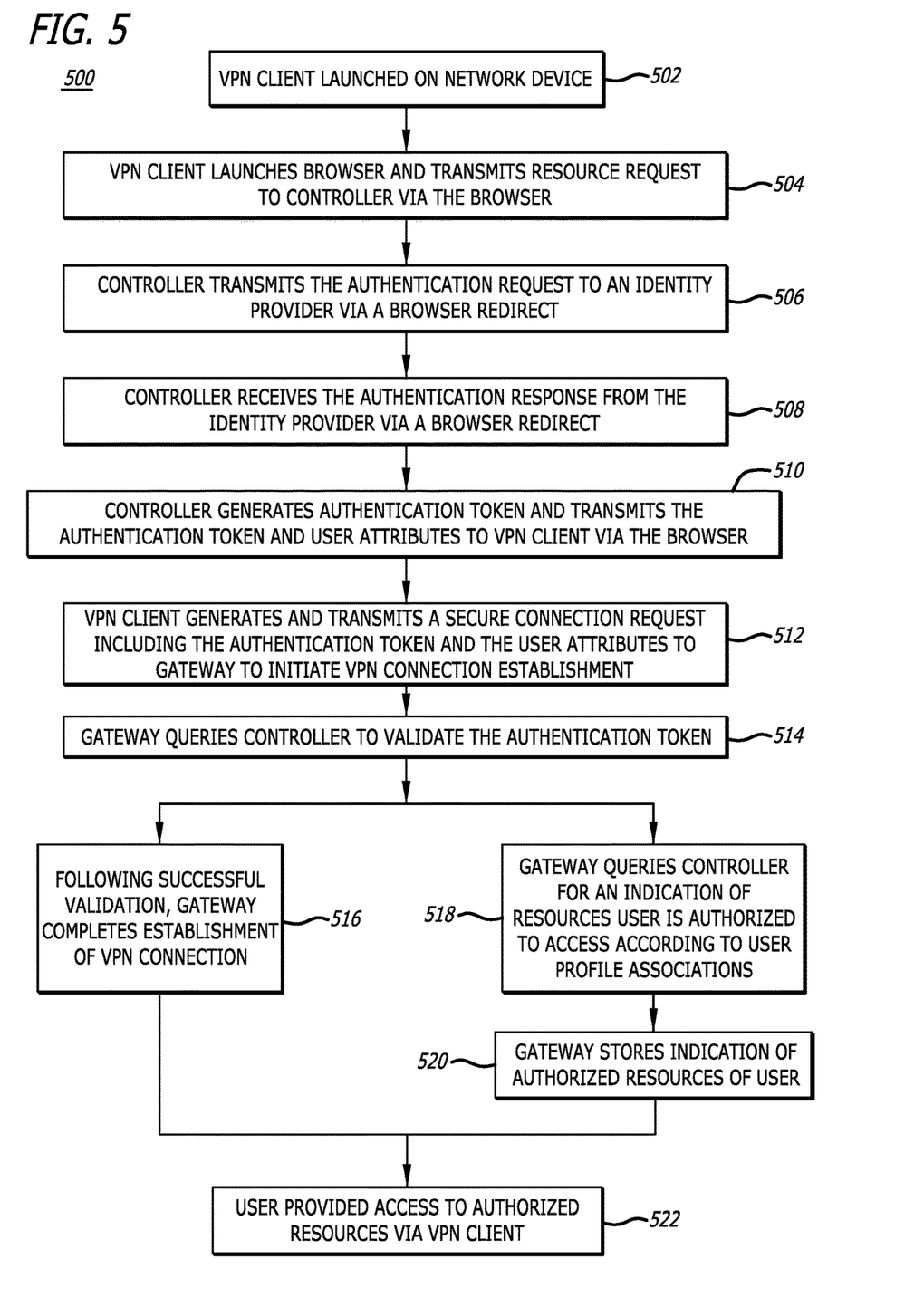
FIG. 5 is a flowchart of a method of an authentication procedure performed by the components of FIG. 1 according to some embodiments.

Referring to FIG. 5, a flowchart of a method of an authentication procedure performed by the components of FIG. 1 is shown according to some embodiments. Each block illustrated in FIG. 5 represents an operation performed in the method 500 of performing an authentication procedure including an establishment of a secure channel between a network device utilizing a virtual private network (VPN) client and a network gateway. Prior to the start of operations comprising the method 500, it is assumed that a networking environment, such as the network environment 100 of FIG. 1, is operationally functioning, e.g., a controller and gateway (managed by the controller) have been deployed and are in communication with one or more of an identity provider and a network device having installed thereon a VPN client. The method 500 beings when a VPN client, such as the VPN client 106 of FIG. 1, is launched on a network, such as the network device 200 (block 502).

The VPN client launches a web browser and transmits a resource request to the controller via the browser over a public network, e.g., the internet (block 504). The controller transmits an authentication request to an identity provider via the browser (e.g., a browser redirect operation), based on the resource request (block 506). For example, an identifier of the user from the resource request is provided in the authentication request to the identity provider.

Following performance of an authentication procedure by the identity provider, the controller receives an authentication response from the identity provider via the browser (e.g., a browser redirect operation) (block 508). The authentication response includes an indication as to whether the authentication procedure was successful, and in some embodiments, one or more profile associations of the user.

Responsive to receipt of the authentication response and in the event that the authentication procedure performed by the identity provider was successful, the controller generates and transmits an authentication token to the VPN client via the browser (block 510). The transmission to the VPN client may also include the user attributes (e.g., a user identifier) and, optionally, profile associations of the user.

The VPN client receives the transmission from the controller, generates a secure a secure connection request including the authentication token and user attributes, and, optionally, the one or more profile associations of the user and transmits the secure connection request to the gateway (block 512). In response to receiving the secure connection request, the gateway queries the controller to validate the authentication token (block 514).

Following the successful validation of the authentication token, the gateway establishes the secure connection with the VPN client (block 516). Additionally, the gateway queries the controller for an indication of resources the user is authorized to access based on the profile associations of the user (block 518). The gateway receives and stores such an indication from the controller, and configures a firewall of the gateway based on the indication (block 520). The user is then provided access to authorized resources behind the gateway via the VPN client (block 522).

Figure 6A:
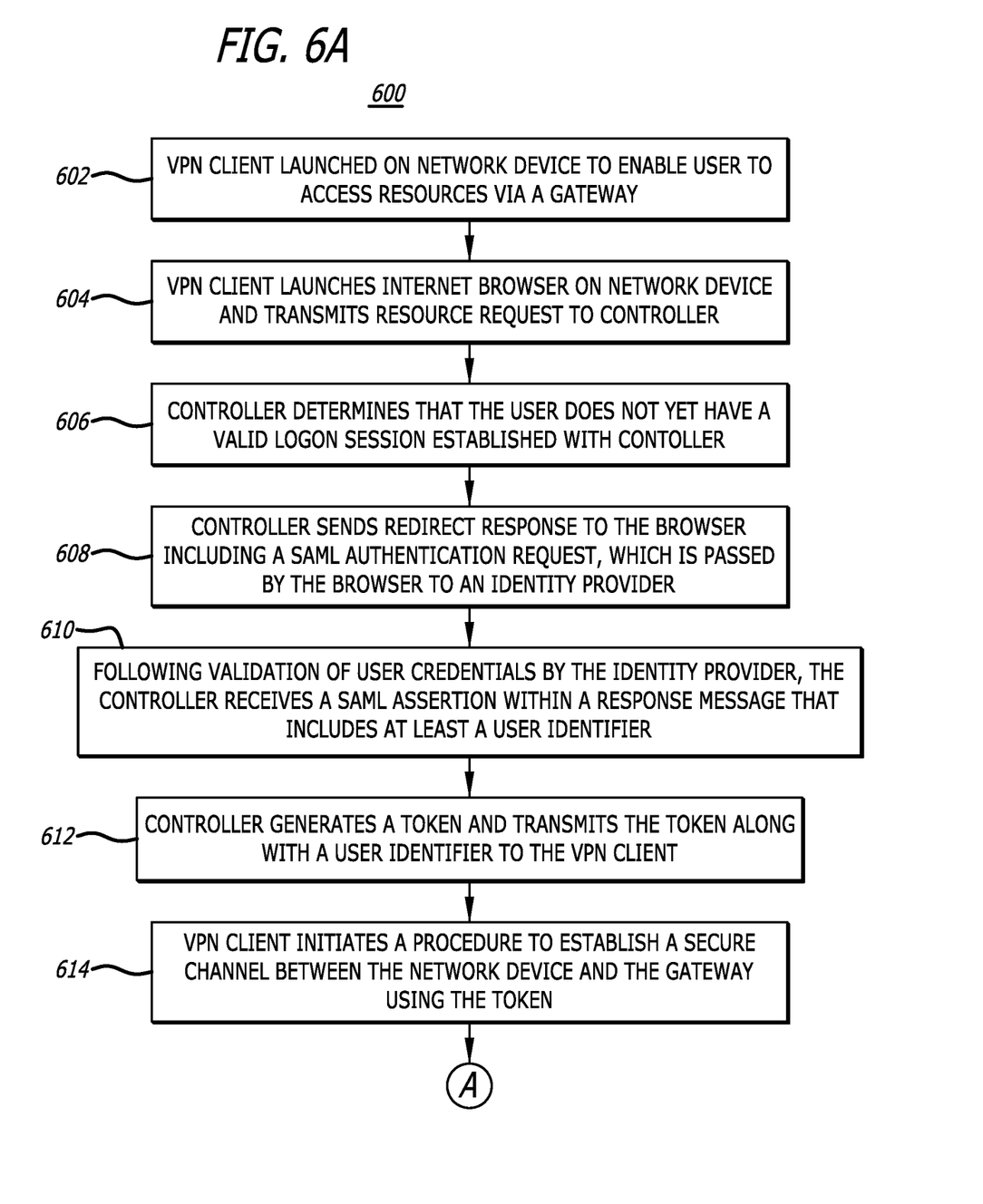
FIGS. 6A-6B illustrate a flowchart of a detailed method of an authentication procedure performed by the components of FIG. 1 according to some embodiments.
Figure 6B:
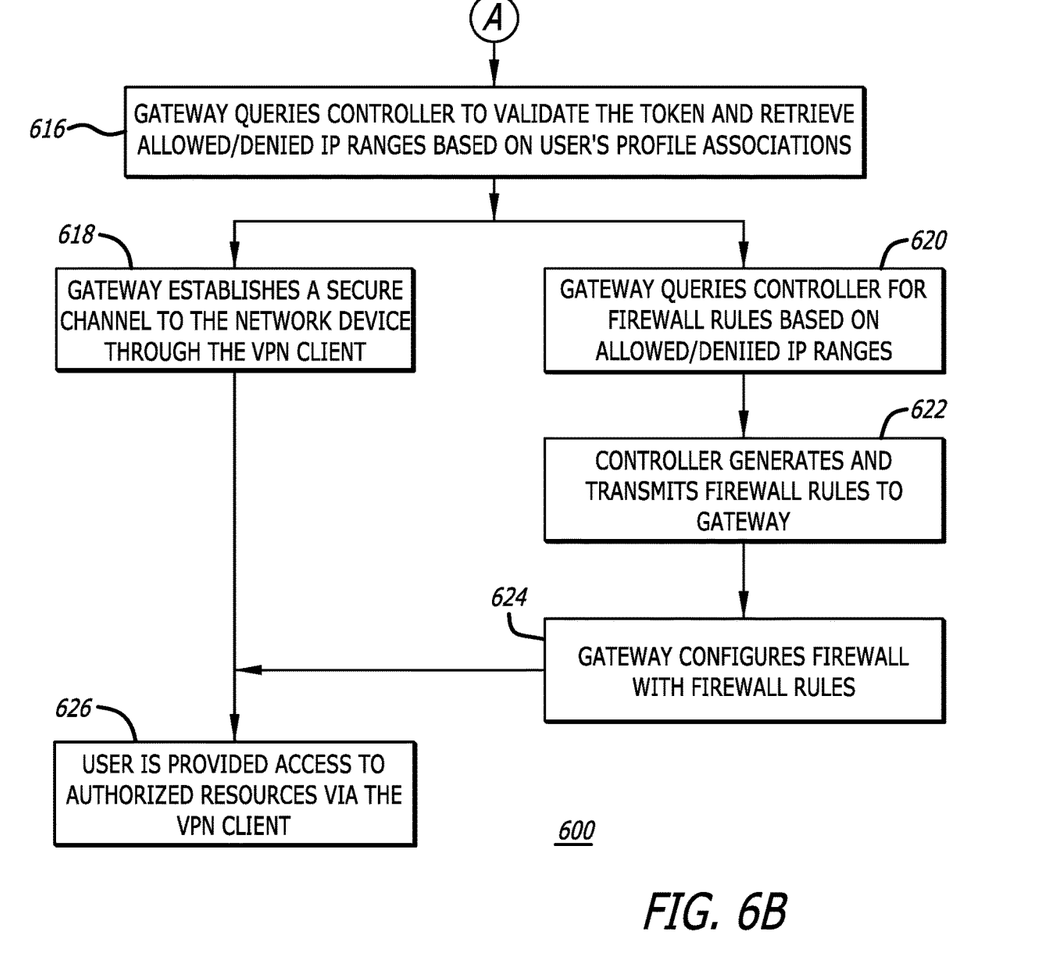

Referring to FIGS. 6A-6B, a flowchart of a detailed method of an authentication procedure performed by the components of FIG. 1 is shown according to some embodiments. Each block illustrated in FIGS. 6A-6B represents an operation performed in the method 600 of performing an authentication procedure including an establishment of a secure channel between a network device utilizing a virtual private network (VPN) client and a network gateway. Prior to the start of operations comprising the method 600, it is assumed that a networking environment, such as the network environment 100 of FIG. 1, is operationally functioning, e.g., a controller and gateway (managed by the controller) have been deployed and are in communication with one or more of an identity provider and a network device having installed thereon a VPN client. The method 600 beings when a VPN client, such as the VPN client 106 of FIG. 1, is launched on a network, such as the network device 200 (block 602).

The VPN client launches a web browser and transmits a resource request to the controller via the browser over a public network, e.g., the internet (block 604). The controller determines that the user does not yet have a valid logon session established with the controller (block 606). The controller then generates a SAML authentication request and transmits a redirect response to the identity provider via the browser, where the redirect response includes the SAML authentication request (block 608). For example, an identifier of the user from the resource request is included in the SAML authentication request.

Following validation of user credentials by the identity provider, the controller receives a SAML assertion generated by the identity provider within a response message, that includes user's profile associations and one or more user attributes to identify the user via the browser (block 610).

In the event that the authentication procedure was successful, the controller generates and transmits a one-time authentication token based on the SAML assertion and an identifier of the user to the VPN client (block 612). The token and the identifier are stored by the controller 102, e.g., in the token database 210, for subsequent validation, as will be discussed below.

The VPN client receives the token and identifier of the user from the controller, generates a secure a secure connection request including the authentication token and the identifier of the user and transmits the secure connection request to the gateway (block 614). In response to receiving the secure connection request, the gateway queries the controller to validate the authentication token and to retrieve allowed/denied IP ranges based on the one or more profile associations of the user (block 616).

Following the successful validation of the authentication token by the controller 102 (through a comparison of the received token/identifier pairing with the stored token/identifier pairing referenced above at block 612), the gateway establishes the secure connection with the VPN client (block 618). Additionally, the gateway queries the controller for firewall rules based on the allowed/denied IP ranges (block 620).

In one example, the gateway may execute a script such as the learn_address script used with OPENVPN®, the execution of which is triggered upon a successful connection between the gateway and the VPN client. Execution of the learn-address script causes transmission of a request for rules to the controller.

The controller generates the firewall rules based on the allowed/denied IP ranges and transmits the rules to the gateway (block 622). In one embodiment, the controller generates the rules based on the information provided from execution of the learn-address script, the predefined user profiles (e.g., allowed or denied IP CIDR ranges) and/or any whitelisted/blacked IP ranges or domains.

The gateway stores the rules and configures its firewall with the firewall rules (624). The user is then provided access to authorized resources behind the gateway via the VPN client in accordance with the firewall rules (block 626).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method, by a controller deployed within a cloud computing network and maintained within a non-transitory storage medium, for establishing a secure channel between a virtual private network (VPN) client processing on a network device for a user and a network gateway, the computerized method comprising:

transmitting, by the controller, an authentication request to an identity provider based on receipt of a resource request from the VPN client;

receiving, by the controller, an authentication response from the identity provider;

generating, by the controller, an authentication token based on the authentication response;

transmitting, by the controller, the authentication token to the VPN client, wherein the controller further stores the authentication token;

receiving, by the network gateway, a secure connection request from the VPN client that includes the authentication token;

validating, by the network gateway, the authentication token by querying the controller for a comparison of a pairing of the authentication token and a user identifier with one or more stored pairings of authentication tokens and user identifiers;

in response to validation of the authentication token, establishing, by the network gateway, the secure connection with VPN client; and providing, by the network gateway, the VPN client with access to resources via the secure connection.

2. The computerized method of claim 1, further comprising:

transmitting, by the VPN client, the resource request to the controller via a web browser over a public network, wherein the controller manages the network gateway.

3. The computerized method of claim 1, further comprising:

generating, by the VPN client, a secure connection request that includes the authentication token.

4. The computerized of claim 1, wherein the authentication request is received by the controller via a web browser, and wherein the authentication request is transmitted by the controller to the identity provider via the web browser.

5. The computerized method of claim 1, wherein the authentication request includes a controller identifier, and wherein the authentication response includes the user identifier and one or more profile associations of the user.

6. The computerized method of claim 1, further comprising:

querying, by the network gateway, the controller for an indication of resources that the user is authorized to access based on the profile associations of the user; and configuring, by the network gateway, one or more firewalls based on the indication of the resources that the user is authorized to access.

7. The computerized method of claim 1, wherein the identity provider is a single sign-on service.

8. The computerized method of claim 1, wherein transmission of data between the controller and the identity adheres to a specified extensible Mark-up Language (XML)-based protocol and utilizes a set of XML-based message bindings.

9. The computerized method of claim 1, wherein the authentication request is an XML document that is universal resource locator (URL)-encoded and added as a query parameter to a URL corresponding to a logon webpage of the identity provider.

10. The computerized method of claim 1, wherein controller stores a table pairing (i) the authentication token, and (ii) a time the authentication response was received by the controller.

11. The computerized method of claim 1, wherein transmitting the authentication request to the identity provider is performed using a Hypertext Transfer Protocol (HTTP) redirect binding.

12. The computerized method of claim 4, wherein transmitting the authentication request to the identity provider via the web browser is performed via a browser redirect.

13. The computerized method of claim 5, wherein the indication of the resources that the user is authorized to access includes one or more blocks of allowed or denied Internet Protocol (IP) ranges.

14. A system for establishing a secure channel between a virtual private network (VPN) client processing on a network device for a user and a network gateway, the system comprising:

a controller deployed within a cloud computing network and maintained within a non-transitory storage medium, wherein the controller is configured to:

transmit an authentication request to an identity provider based on receipt of a resource request from the VPN client, receive an authentication response from the identity provider, generate an authentication token based on the authentication response, transmit the authentication token to the VPN client, wherein the controller further stores the authentication token; and the network gateway deployed within the cloud computing network and managed by the controller, wherein the network gateway is configured to:

receive a secure connection request from the VPN client that includes the authentication token, validate the authentication token by querying the controller for a comparison of a pairing of the authentication token and a user identifier with one or more stored pairings of authentication tokens and user identifiers, establish the secure connection with VPN client, and provide the VPN client with access to resources behind the network gateway via the secure connection.

15. The system of claim 14, further comprising:

transmitting, by the VPN client, the resource request to the controller via a web browser over a public network; and generating, by the VPN client, the secure connection request that includes the authentication token.

16. The system of claim 14, wherein the authentication request includes a controller identifier, and wherein the authentication response includes the user identifier and one or more profile associations of the user.

17. The system of claim 14, further comprising:

querying, by the network gateway, the controller for an indication of resources that the user is authorized to access based on the profile associations of the user; and configuring, by the network gateway, one or more firewalls based on the indication of the resources that the user is authorized to access, wherein the indication of the resources that the user is authorized to access includes one or more blocks of allowed or denied Internet Protocol (IP) ranges, and wherein the identity provider is a single sign-on service.

18. The system of claim 14, wherein transmission of data between the controller and the identity adheres to a specified extensible Mark-up Language (XML)-based protocol and utilizes a set of XML-based message bindings, and wherein the authentication request is an XML document that is universal resource locator (URL)-encoded and added as a query parameter to a URL corresponding to a logon webpage of the identity provider.

19. The system of claim 14, wherein controller stores a table pairing (i) an authentication token, and (ii) a time the authentication response was received by the controller.

20. The system of claim 14, wherein transmitting the authentication request to the identity provider is performed using a Hypertext Transfer Protocol (HTTP) redirect binding.

* * * * *